Dec. 14, 1954  
F. J. HENDEL  
2,697,078  
PROCESS OF REGENERATING A SPENT NICKEL  
SULFIDE HYDROFINING CATALYST  
Filed June 25, 1951
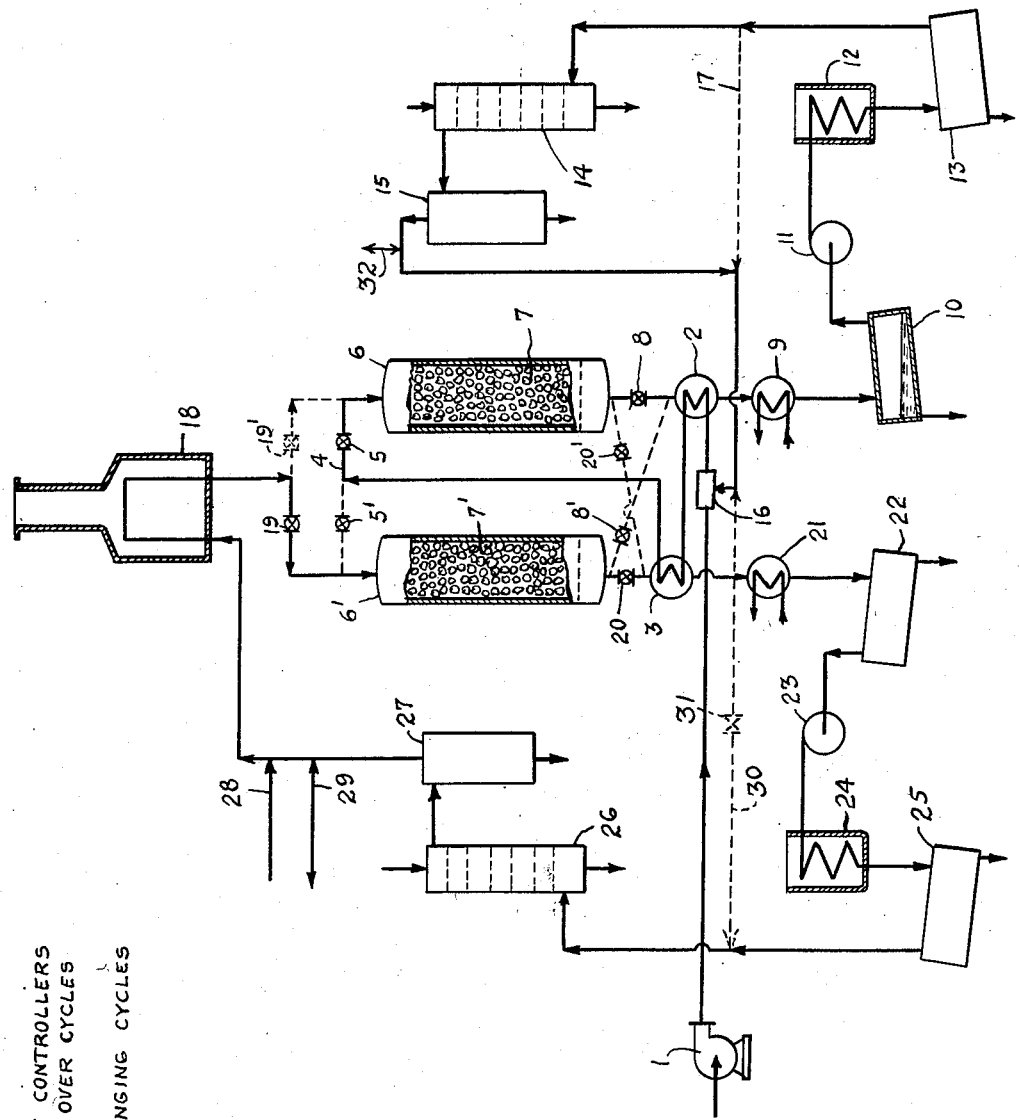
⊠ ELECTRIC CYCLE CONTROLLERS
FOR SWITCHING OVER CYCLES
--⊠-- LINES FOR CHANGING CYCLES
INVENTOR
FRANK J. HENDEL
BY
*Howard P. Thompson*
ATTORNEY

United States Patent Office 2,697,078
Patented Dec. 14, 1954

2,697,078

PROCESS OF REGENERATING A SPENT NICKEL SULFIDE HYDROFINING CATALYST

Frank J. Hendel, Newark, N. J., assignor to Wigton-Abbott Corporation, Plainfield, N. J., a corporation of New Jersey Application June 25, 1951, Serial No. 233,399

4 Claims. (Cl. 252—411)

This invention relates to catalyst regeneration procedures which involve the conversion of spent catalysts comprising metal sulfides to catalytically active free metals and/or metal oxides. More particularly, the invention relates to regeneration of hydrofining catalysts by recirculation of hydrogen containing gases, while removing from said gases, hydrogen sulfide formed in the process.

In catalytic procedures for removing sulfur from hydrocarbon oils and other petroleum fluids, a factor seriously impairing the commercial value of such procedures is the rapidity with which catalytic metals and metal oxides are inactivated by conversion to metal sulfides, and the difficulty generally encountered in attempting to regenerate the catalyst. Some of these procedures which effect both hydrogenation and desulfurization of hydrocarbon oils and other petroleum fluids are referred to as hydrofining procedures, and the hydrofining catalysts employed therein generally include nickel, cobalt, iron, and copper as free metal, oxides, sulfides, or mixtures thereof in the form of pellets, lumps, powder, and powder supported on an inert carrier such as calcum sulfate, alumina, silica, graphite, sodium sulfate, etc.

Heretofore, the most effective methods for regenerating spent hydrofining catalysts and other sulfur poisoned catalysts have involved circuitous chemical steps which frequently result in poor yields of catalytically active forms of the metals or metal oxides. While reduction of metal sulfides by heating with hydrogen has been suggested, no practical way of regenerating active catalyst by such procedures has heretofore been developed.

I have discovered that sulfur poisoned catalysts of the type mentioned can be regenerated in an efficient and commercially practical way by a new procedure which involves removal of sulfur from the catalyst as hydrogen sulfide by recirculating through the catalyst at relatively high velocity a stream of hydrogen containing gases at elevated temperature and pressure, and absorbing hydrogen sulfide from said gases while maintaining a high hydrogen concentration on said gases by adding hydrogen and/or steam thereto.

In addition to the primary regeneration by removing sulfur from the catalyst, my new process is also very effective as a means for removing "coke," i. e., very heavy hydrocarbons, which in some hydrofining procedures, tends to accumulate on the catalyst. This removal of "coke" is very significant since a "coke" deposit can impair or destroy the activity of the catalyst, even in instances where sulfur poisoning has not become serious.

My new catalyst regeneration process is closely allied to a new method of hydrofining hydrocarbon oils and other petroleum fluids which I have called a rehydrofining process and which is fully disclosed and claimed in my co-pending application Serial Number 227,872, filed May 23, 1951. The rehydrofining process may be briefly described as the process that comprises passing a stream of sulfur containing petroleum fluid at elevated temperature and pressure through a bed of hydrofining catalyst, separating liquid and gaseous components of the mixture leaving said catalyst, removing hydrogen sulfide from said gaseous components, and continuously combining the residual gases with fresh quantities of petroleum fluid entering the system, while preferably maintaining a substantially uniform hydrogen concentration in the gases recirculated in the system.

In the rehydrofining process, above described and as more fully disclosed in said co-pending application, the petroleum fluid to be treated is fed to the system by a suitable pump or feed means which is independent of the gas compressor or recirculating means. Thus, it will be apparent that the rehydrofining equipment can be employed in my new regeneration procedure merely by by-passing the petroleum fluid feed means and by suitably modifying the heating of the stream of recirculated gases. In this connection, it will be noted that, generally, the temperature used in regeneration may extend higher than the temperatures employed during rehydrofining.

As a further embodiment of my invention and as a supplement to the regeneration procedure, as above described, I have found that it is sometimes advantageous to employ a further regeneration or cleaning step, which involves passing tap water at elevated temperature and pressure through the reactor or bed of catalyst and through portions of the circulating system to wash out hydrogen sulfide and other undesirable materials which may remain in the reactor and circulating lines. Such washing is generally continued until hydrogen sulfide can no longer be detected with lead acetate.

Following such washing with hot water, it is generally desirable to wash the apparatus and catalyst with a small amount of light petroleum fluid, such as naphtha. This washing with organic solvent aids in removing traces of heavy hydrocarbons which may remain in the system following the regeneration and water wash.

While the supplementary procedures of washing with hot water and with light petroleum fluid are desirable from time to time where maximum cleaning and regeneration of the system are desired, it should be understood that the catalyst can be carried through a number of regenerations by gas recirculation alone before it would be necessary to employ such supplementary washes.

Regarded in certain of its broader aspects, my novel regeneration process comprises passing a stream of hydrogen containing gas at elevated temperature and pressure through a bed of sulfur-containing spent hydrofining catalyst, separating liquid and gaseous components of the mixture leaving said catalyst, removing hydrogen sulfide from said gaseous components, and continuously recycling the hydrogen sulfide free gases through said catalyst, while supplementing the hydrogen component thereof to maintain a substantially uniform hydrogen concentration in the gases; and as a supplementary procedure for reconditioning the system after regeneration by gas recirculation, washing the catalyst and circulating lines with water at elevated temperature and pressure until the wash water contains no detectable hydrogen sulfide and, then, washing the catalyst and circulating lines with a light petroleum fluid of low sulfur content.

The manner of carrying out my regeneration process, particularly when employed in conjunction with the rehydrofining procedure, above mentioned, is basically the same, whether a single reactor or bed of catalyst, or a plurality of such reactors are employed. By using two reactors, one on a rehydrofining cycle and the other on a regenerating cycle and employing separate circulating systems for the two cycles, it is possible to operate continuously in the rehydrofining cycle merely by switching the two reactors from one cycle to the other.

The manner of carrying out my regeneration procedure in conjunction with the rehydrofining of petroleum fluids will be readily understood from a consideration drawing, which diagrammatically indicates a typical two-reactor apparatus set up, and wherein the parts of said apparatus are identified by suitable reference characters.

The apparatus, as shown in the drawing, involves two reactors or columns containing catalyst, one of which is operating on the rehydrofining cycle, while the other is operating on the regeneration cycle. In conjunction with the two reactors are separate circulating systems for gases and hydrocarbon fluids, one system being devoted to the rehydrofining process, and the other being devoted to the regeneration process and the two circulating systems are so interrelated that simultaneous operation of a plurality of cycle controlling valves can instantaneously switch the relationship of reactors to the two circulating systems.

Hydrocarbon oil or other petroleum fluid containing undesirable sulfur compounds enters the hydrofining system through a feed pump 1, from where it passes through heat exchangers 2 and 3 and, then, to a branched line 4, having automatic cycle controlling valves 5, 5' for directing the feed to reactors 6 and 6', each containing a suitable rehydrofining catalyst 7, 7'. As catalyst, I can employ any of the hydrofining catalysts which, as previously noted, generally include nickel, cobalt or iron, either as free metal, oxides, sulfides or mixtures thereof. As shown in the drawing, the feed of petroleum fluid passes to the reactor 6, which is on the rehydrofining cycle and the valve 5' is closed, preventing passage of the petroleum fluid to reactor 6' which is in the regeneration cycle.

The catalysts 7, 7' may be in any form to provide a high catalytic surface as, for example, pellets, lumps, powder or even powder supported on an inert carrier, such as calcium sulfate, alumina, silica, graphite, sodium sulfate, etc. Rehydrofined product passes from the reactor 6, and from the reactor 6' when the latter reactor is on the rehydrofining cycle, through connecting lines including automatic cycle control valves 8, 8' to the heat exchanger 2, where a part of the heat of the rehydrofined product is given up to the petroleum fluid feed. From the heat exchanger 2, the products pass through a water cooler and condenser 9 to a separating receiver 10, where rehydrofined liquid product is separated from gaseous components.

The gaseous components from the separator 10 are picked up by a gas compressor 11 and pass through a cooler and condenser 12 to a second liquid separator 13 in which additional rehydrofined product or lighter hydrocarbon fractions are removed as liquid. The gaseous components from the separator 13 pass to a hydrogen sulfide absorber 14, which may contain as adsorbent a solid material, such as lime or a liquid adsorbent, such as caustic soda solution, monoethanolamine or sodium phenolate solution. Gases leaving the hydrogen sulfide absorber pass through a cyclone separator or knock-out drum 15 for removing suspended particles of solid and/or fluid droplets, and from there pass to a mixing unit or point 16 between the pump 1 and heat exchanger 2, where the recirculating gases are mixed with the petroleum fluid feed.

In operation of the rehydrofining cycle, a considerable period of time may elapse before hydrogen sulfide appears in the recirculating gases. It is, therefore, preferable to employ a by-pass 17, through which gases may pass directly from the separator 13 to the mixing point 16 without going through the hydrogen sulfide absorber 14.

In the regeneration cycle or system, the apparatus employed is generally similar to that employed in the rehydrofining cycle or system, the primary differences being in the provision of means for introducing steam and adding or withdrawing hydrogen, and in provision of independent means for preheating the recirculating gases as they are fed to the catalyst being regenerated. Thus, it will be noted that regenerating gas is passed through a heater 18, which may be heated by any suitable means, as for example, by combustion of waste refinery gases, to preheat the regenerating gas to a temperature generally within the range of about 200 to 880° C.

Preheated gases leaving the heater 18 pass to a divided line, including automatic cycle control valves, 19, 19' registering with the reaction chambers of the reactors 6', 6, respectively. As shown in the drawing, when the reactor 6' is on the regeneration cycle, the valve 19' will be closed and the valve 19 will be open, permitting passage of the circulating gases through the valve 19 to the reactor 6'.

Within the reactor 6', the regenerating gases contact the spent catalyst 7' picking up sulfur as hydrogen sulfide and pass from the reactor 6' through a discharge line having an automatic cycle changing valve 20 and through the heat exchanger 3 and a condenser 21 to a receiver and liquid separator 22.

Between the reactor 6 and heat exchanger 3, there is a further connecting line, having an automatic cycle changing valve 20', which is closed when the reactor 6' is on the regeneration cycle. In changing the cycles opening valve 20' and closing valve 20 simultaneously with the opening of valves 5', 8' and 19' and closing of the valves 5, 8 and 19 will instantaneously convert reactor 6' to the rehydrofining cycle and the reactor 6 on the regeneration cycle.

In the separating receiver 22, liquid condensate is separated from the circulating gases which are picked up by a compressor 23 and passed through a cooler or condenser 24 to a second liquid receiver or separator 25, in which light hydrocarbons and other light condensate is removed.

The gaseous components leaving the separator 25 pass to a hydrogen sulfide absorber 26 and from there to a cyclone separator or knock-out drum 27 for removal of suspended droplets and/or solid particles. Gases leaving the separator or knock-out drum 27 pass to the heater 18, thus completing the regeneration cycle and it will be noted, in this connection, that the compressor 23 provides the primary means for driving or circulating the regenerating gases.

Within the regeneration cycle and preferably between the separator or knock-out drum 27 and the heater 18 is a suitable feed line 28 for introducing steam to the system and a second feed or discharge line 29 for adding or removing hydrogen or hydrogen containing gas from the system, as more fully hereinafter described.

Between the liquid separator 25 and the hydrogen sulfide absorber 26, a by-pass line 30 is provided, which connects the regeneration cycle with the rehydrofining cycle at the mixing unit or point 16, where recycled gases in the rehydrofining cycle are combined with the hydrocarbon oil or other petroleum fluid feed. The by-pass 30 provides means for increasing or decreasing the hydrogen concentration of gases recirculated in the rehydrofining system and, for this purpose, the by-pass 30 is provided with a suitable valve 31. As a further means for controlling the pressure and hydrogen concentration in the rehydrofining cycle, a hydrogen feed and discharge line 32 is provided in the circulating line leaving the separator or knock-out drum 15. At the mixing point 16, where recirculated gases in the rehydrofining system are mixed with the hydrocarbon oil or other fluid feed, the gas pressure will, at all times, be greater than the fluid pressure as fed by the pump 1, but depending upon the differences in pressure between the recirculating gases in the rehydrofining and regenerating systems, the following situations may exist:

(a) If hydrogen is being formed during the rehydrofining cycle, the gas pressure may build up in the rehydrofining system so that, at the mixing point 16, part of the gases will mix with the fluid feed and continue on through the rehydrofining cycle, while a small amount of the gases are withdrawn from the regeneration cycle through the by-pass 30.

(b) When hydrogen is being consumed faster than it is formed in the rehydrofining cycle, recirculated gases in the regenerating cycle may pass through the by-pass 30 and join the fluid feed of the rehydrofining cycle at the mixing point 16 to supplement the recirculated gases in the rehydrofining cycle in order to maintain the desired pressure and hydrogen concentration therein.

(c) When the rehydrofining cycle is operating under conditions such that hydrogen is being liberated and consumed at substantially the same rate, there may be virtually no movement of gases in either direction through the by-pass 30.

In carrying out the rehydrofining and regeneration procedures, the conditions in the rehydrofining system are maintained as disclosed in said co-pending application, Serial Number 227,872 filed May 23, 1951, i. e., reactor temperature within the range of about 150–1100° F., reactor pressure within the range of about 5–100 p. s. i. g., space velocity determined by the fraction $$\frac{\text{volume of fluid feed per hour}}{\text{volume of catalyst}}$$

within the range of about 0.1 to 10, and gas recirculating velocity determined by the fraction $$\frac{\text{cu. ft. of recirculating gas per minute}}{\text{cross-section of the reactor in sq. in.}}$$

is within the range of about 0.01 to 10. The optimum conditions in each instance will, of course, depend upon a number of factors such as the composition of the catalyst, the type of petroleum fluid feed, i. e., whether a light fraction or a heavier material, such as diesel-oil, and the nature and amount of the sulfur compounds to be removed therefrom.

In the regeneration cycle, the condition of temperature, pressure, etc. differ considerably from the conditions employed in rehydrofining. The temperature within the reactor during regeneration should be within the range 200 to 880° C. The pressure can vary from 1 to 500 p. s. i. a.

(pounds per square inch absolute); in other words, regeneration can be at reduced (gage) pressure as well as elevated pressure. The gas recirculating velocity as determined by the fraction cu. ft. of recirculating gas per minute / cross-section of the reactor in sq. in.

can range from 0.01 to 100. The hydrogen concentration in the recirculating gases can be as low as about 10%.

Both the higher temperature and higher gas velocity have the effect of shortening the time required for regeneration. This is of practical significance, particularly when the petroleum fluid being rehydrofined contains refractory sulfur, i. e., sulfur which is not readily removed. Rehydrofining of such petroleum fluid can be continued for extended periods i. e., several days, or even weeks, only if a very low space velocity is employed. With a means of rapid regeneration available, however, it becomes practical to run feed containing refractory sulfur at a high space velocity intentionally bringing about rapid inactivation of the catalyst. With a two reactor set up of the type shown in the drawing, it is possible to continuously run a feed containing refractory sulfur at a high space velocity by frequently changing the two reactors with respect to the rehydrofining and regeneration cycles.

The rate of regeneration is further increased by injecting steam into the system, as for example, through the line 28 shown in the drawing. The effect of the addition of steam is to increase the rate of removal of sulfur from the catalyst as $H_2S$. By way of illustration, in a particular regeneration, the gas recirculation rate had been 0.7 cu. ft./min./sq. in. of the reactor cross-section as measured at S. T. P. conditions. The temperature in the reactor was 450° C., and the outgoing gases, after being cooled, were sampled and analyzed for $H_2S$, showing the gases to contain 0.010 gm. of $H_2S$ per cu. ft. Steam was then injected at a rate of one volume of steam to nine volumes of gas as measured at S. T. P. conditions and the temperature in the reactor was kept at 450° C. Upon again cooling and analyzing the outgoing gases, it was found that the $H_2S$ concentration had increased to 0.014 gram per cu. ft.

The continued injection of steam causes the pressure of the system to creep upward, indicating that the steam is not wholly condensed and removed in the receivers 22 and 25, but to some extent dissociates in the presence of the catalyst according to the equilibrium equation:

$$2H_2O \rightleftarrows 2H_2 + O_2$$

Although the degree of dissociation at the regeneration conditions is very small, the increase in the hydrogen content of the gases is higher than the consumption of hydrogen according to the reaction $$NiS + H_2 = Ni + H_2S$$

When no steam is added to the system, the pressure drops steadily (unless there is a feed of hydrogen containing gas through the line 29) as the hydrogen is converted to $H_2S$ and removed in the $H_2S$ absorber.

The oxygen formed from the dissociation reacts with the reduced metal to form the oxide, i. e., nickel is converted to NiO, and no oxygen accumulates in the recirculating gases.

As previously mentioned, the regeneration by recirculation of hydrogen containing gases also is very effective in removing from the catalyst deposits of "coke," or very heavy hydrocarbons, which sometimes form during rehydrofining. It should be noted, in this connection, that the optimum rate of steam addition will vary considerably with different conditions and compositions of spent catalyst. I have found, however, that steam to gas ratios by volume (S. T. P.) of 1 part steam to 5–15 parts of recirculating gases are generally most suitable.

The hydrogen concentration in the circulating gases leaving the reactor during regeneration should be above about 10% and preferably between 60% and 80% by volume. The balance of the gases leaving the reactor is generally made up of methane, other light hydrocarbons, and traces of hydrogen sulfide and may include a small amount of nitrogen.

From time to time, particularly after a number of regenerations by recirculation, the reactor and circulating lines, as well as the circulating lines of the rehydrofining cycle can advantageously be cleaned out, and the catalyst further regenerated, by washing with hot water under pressure e. g., 180–200° F. and 50 p. s. i. g. pressure.

The washing with hot water is continued for a rather extended period, e. g., four to six hours, or even longer, until $H_2S$ can no longer be detected therein with lead acetate.

When the supplemental cleaning of apparatus and catalyst by washing with water is employed, the water wash should be followed by a circulation of naphtha or other light petroleum fraction which is essentially free of sulfur. This solvent wash removes the residual water and has the further effect of dissolving out "coke" which may have resisted hydrogenation during the regeneration by gas recirculation.

The frequency of regeneration of catalyst by gas recirculation will depend upon the speed with which the catalyst becomes inactivated during rehydrofining. A feed of petroleum fluid high in refractory sulfur may require regeneration every few days, while a feed containing only a small amount of readily removable sulfur can frequently be run for several weeks, or even months on the rehydrofining cycle before regeneration becomes necessary. The supplemental cleaning and regeneration with hot water, as above described, is generally employed after two to four regenerations by gas recirculation during a continued run of the same feed.

It is advantageous, however, when switching to a different type of petroleum fluid feed to carry out the overall procedure of regeneration, cleaning with hot water, and washing with solvent, so that impurities from one type of feed are not transferred to another type feed or to the rehydrofined product obtained therefrom. I have found that operation with different feeds, such as naphtha, diesel-oil, gasoline, etc., can be continued over a period of several months with consistently good hydrofining and without any appreciable loss of activity of the (regenerated) catalyst when the regeneration and cleaning procedures, above described, are employed as needed.

It should further be noted that petroleum fluids derived from asphaltic crude, and particularly asphaltic diesel oils, when subjected to rehydrofining, tend to form resinous deposits on the catalyst which are difficult to remove and which can rapidly destroy the activity of the catalyst. I have found, however, that the asphaltenes or other objectionable components of asphaltic petroleum fluids can be removed by passing the petroleum fluid at elevated temperature and essentially in the vapor state through a bed of sand or absorbent clay. When hot vapors of the petroleum oil are then subjected to rehydrofining in the manner herein described, there is virtually no formation of resinous deposit on the catalyst.

The following example shows typical conditions which have been effectively employed for a number of successive regenerations of spent nickel catalyst by gas recirculation, but it is to be understood that this example is given by way of illustration and not of limitation.

*Example*

In an extended rehydrofining run of Wyoming Visbreaker naphtha, a reactor 8 ft. high and 2 in. inside diameter was employed having catalyst (about 2540 gm.) arranged in three one foot sections, the catalyst being in the form (when fresh) of ⅛" pellets and having the approximate composition, 76.1% NiO, 19.4% $SiO_2$ and 4.5% graphite. From time to time during this extended run as the activity of the catalyst was diminished by the formation of about 20% nickel sulfide and 0.3% "coke" deposit, the catalyst was regenerated by recirculating hydrogen containing gases at the rate of about 130 cu. ft. per hour through the reactor. The temperature in the reactor was about 900° F. and the pressures in the system were as follows:

| | P. s. i. g. |
|---|---|
| Pressure in the reactor | 20.5 |
| Pressure in the receiver | 20 |
| Pressure in the $H_2S$ absorber | 35 |

Hydrogen, as such, was not added, but instead, steam was introduced into the recirculating gases leaving the $H_2S$ absorber, the amount of steam being generated from water fed at a rate of about 200 cc. per hour.

During most of the regeneration time, the amount of $H_2S$ in the gases leaving the reactor was about 0.06% by volume, and regeneration was continued until a distinct drop in this $H_2S$ concentration indicated that a substantial amount of sulfur had been removed from the catalyst, i. e., generally about five days.

After each regeneration, the catalyst appeared to have substantially the same activity or desulfurizing capacity as when it was initially employed in the first rehydrofining operation.

Various changes and modifications in the procedures herein described will occur to those skilled in the art, and to the extent that such changes and modifications are embraced by the appended claims, it is to be understood that they constitute part of my invention.

I claim:

1. In a process for regenerating spent nickel sulfide hydrofining catalyst, that comprises passing a stream of hydrogen containing gases at elevated temperature and pressure through a bed of spent nickel sulfide catalyst, separating liquid and gaseous components of the mixture leaving said catalyst, and removing hydrogen sulfide from said gaseous components, the improvement that comprises continuously recycling the hydrogen sulfide free gases through said catalyst, while supplementing the hydrogen component thereof by addition of steam which dissociates on contact with said catalyst forming hydrogen and oxygen, the addition of steam being at a rate, within the range of about 1 volume of steam to each 5 to 15 volumes of recycling gases as measured at S. T. P. conditions, to maintain a substantially uniform hydrogen concentration in said gases.

2. The process as defined in claim 1, wherein the hydrogen concentration of the recirculating gases is maintained above about 10% by volume.

3. The process as defined in claim 1, wherein the hydrogen concentration of the recirculating gases is maintained at about 60–80% by volume.

4. The process as defined in claim 1, wherein the gas recirculating velocity as determined by the fraction $$\frac{\text{cu. ft. of recirculating gas per minute}}{\text{cross-section of the reactor in sq. in.}}$$

is within the range of about 0.01 to 100.

References Cited in the file of this patent

UNITED STATES PATENTS

| Number | Name | Date |
|---|---|---|
| 1,868,581 | Miller | July 26, 1932 |
| 2,262,427 | Liedholm | Nov. 11, 1941 |
| 2,285,716 | Hulsberg | June 9, 1942 |
| 2,359,660 | Martin | Oct. 3, 1944 |
| 2,403,052 | Cole et al. | July 2, 1946 |
| 2,409,690 | Nicholson et al. | Oct. 22, 1946 |
| 2,426,483 | Boucher et al. | Aug. 26, 1947 |
| 2,500,776 | Teter | Mar. 14, 1950 |